United States Patent [19]

Rath

[11] 3,918,555

[45] Nov. 11, 1975

[54] APPARATUS FOR LOCATING A FRICTION PAD ASSEMBLY TO A SUPPORT MEMBER

[75] Inventor: Heinrich Bernhard Rath, Koblenz, Germany

[73] Assignee: Girling Limited, Birmingham, England

[22] Filed: Jan. 21, 1975

[21] Appl. No.: 542,810

[30] Foreign Application Priority Data

Jan. 22, 1974 United Kingdom................. 3003/74
Feb. 13, 1974 United Kingdom................. 6445/74

[52] U.S. Cl.......... 188/73.5; 188/205 A; 188/250 R
[51] Int. Cl.²......................................... F16D 65/02
[58] Field of Search............. 188/73.1, 73.5, 250 R, 188/250 B, 250 F, 250 G, 251 R, 205 A, 234; 161/167, 406

[56] References Cited
UNITED STATES PATENTS

| 2,272,532 | 2/1942 | Shriver............................ 161/406 |
| 2,292,024 | 8/1942 | Dreher............................. 161/167 |
| 3,113,643 | 12/1963 | Botterill............................ 188/73.5 |
| 3,506,098 | 4/1970 | Anders............................. 188/73.5 |
| 3,639,500 | 2/1972 | Mieny et al....................... 161/167 |

FOREIGN PATENTS OR APPLICATIONS

| 1,197,773 | 7/1970 | United Kingdom................. 188/73.1 |
| 1,203,064 | 8/1970 | United Kingdom................. 188/73.1 |

Primary Examiner—Trygve M. Blix
Assistant Examiner—Edward R. Kazenske
Attorney, Agent, or Firm—Scrivener Parker Scrivener and Clarke

[57] ABSTRACT

A fricton pad assembly is located in a vehicle disc brake in its position of use between a rotatable disc and a support for applying the pad assembly to the disc by means of a strip of substantially incompressible material. The strip is coated on both faces with adhesive and is adapted to be interposed between the pad assembly and the support so that the adhesive locates the friction pad assembly without actually clamping it.

17 Claims, 12 Drawing Figures

APPARATUS FOR LOCATING A FRICTION PAD ASSEMBLY TO A SUPPORT MEMBER

SPECIFIC DESCRIPTION

This invention relates to improvements in disc brakes of the kind in which a friction pad assembly is adapted to be applied to one side of a rotatable disc by a support which may comprise a piston in the case of a directly actuated pad assembly and a part of a caliper or clamping member in the case of an indirectly actuated pad assembly.

Disc brakes are liable to squeal under certain conditions, and various attempts have been made to prevent this by modification of the mounting and application of the friction pad assemblies. For example, in brakes of the single-sided floating caliper type it has been proposed to clamp the outboard friction pad assembly to the caliper, and in brakes of the fixed caliper opposed-cylinder type it has been proposed to offset the engagement between a piston and a friction pad assembly.

Furthermore, in our U.S. Pat. No. 3,113,643 we have described and claimed a disc brake in which, for the purpose of eliminating or reducing squeal, there is interposed between the friction pad assembly and an hydraulically actuated piston a shim of which a part is cut out over a portion of what would normally be the area of contact between the piston and the friction pad assembly, whereby when the piston is pressurised it applies a thrust to the backing plate only over the remainder of that area.

According to our invention, for the purpose of locating a friction pad assembly in a disc brake, of the kind set forth, we provide a strip of substantially incompressible material coated on both faces with adhesive and adapted to be interposed, in its position of use, between the friction pad assembly and the support.

When the strip is in its position of use, the adhesive locates the friction pad assembly without actually clamping it, and restricts and damps any relative movement, radial or circumferential, between the pad assembly and the support.

By attaching the pad assembly to the support, the vibrating mass is increased. This modifies the vibration frequency of the pad assembly by reducing it to a lower and less audible level.

The material may comprise metal and the strip may be of laminated construction provided with at least two separate metal layers interconnected by resilient material. Such a construction damps out and prevents amplification of high frequency vibrations.

The adhesive employed is such that the bond formed by the adhesive between the friction pad assembly and the support is sufficient to prevent relative movement of the pad assembly in use but is not so great as to prevent withdrawal of the pad assembly when the pad assembly has to be replaced.

Suitable adhesives are available on the market, a particularly suitable adhesive being based on uncured rubber embedded in silk.

Our invention further comprises a friction pad assembly for a disc brake carrying a strip of metal coated on both sides with adhesive, one face of the strip being applied to and bonded to the pad assembly by the adhesive on that face of the strip while the other face is exposed and is adapted to serve to bond the pad assembly to a support.

In a replacement pad assembly the exposed face of the coated metal strip will be protected by a layer of oiled paper which is peeled off before the pad is inserted into the brake.

Alternatively, the metal strip may be fitted into the brake with the friction pad assembly, both sides of the strip being protected by oiled paper in storage before fitting so that the bonding of the strip to the pad and to the support are effected simultaneously.

In the initial assembly of the brake at a factory the coated metal strip may be supplied in the form of a roll from which appropriate lengths are cut off automatically during assembly.

A suitable metal for the strip is aluminium, but various other metals or alloys may be employed.

When the strip comprises a shim having a cut-out and the support comprises a piston working in an hydraulic cylinder, the shim is located on that side of the axis of the hydraulic cylinder with which any given point on the brake disc first comes into alignment in the normal forward direction of disc rotation so that the centre of the area of the engagement between the piston and the pad assembly lies on the other side of the axis of the cylinder.

The shim may be so shaped that it can only be inserted the right way round, or it may carry a marking, such as an arrow, to ensure that it is fitted correctly.

Some embodiments of our invention are illustrated in the accompanying drawings in which.

Figure 1:
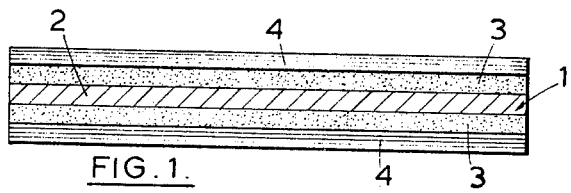
FIG. 1 is a transverse section through a metal locating strip.

The locating strip 1 illustrated in FIG. 1 comprises a flexible strip of a substantially incompressible material, suitably a metal, for example aluminium, coated on both side faces with a layer of adhesive 3 conveniently the strip comprises a length cut from a roll as required with the coated faces protected by "peel-off" layers of oiled paper 4. The adhesive may be of any commercially available type but an adhesive based on uncured rubber embedded in silk is particularly suitable.

Figure 2:
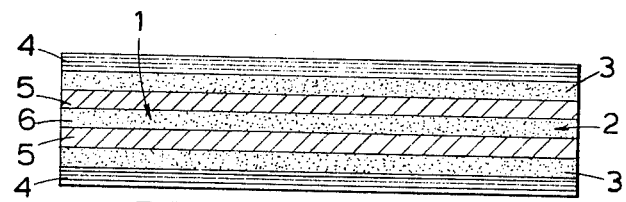
FIG. 2 is a section similar to FIG. 1 of a strip of laminated construction.

In the modified construction illustrated in FIG. 2 the metal strip 2 is of laminated construction comprising two metal layers 5 which are interconnected by resilient material 6 which may comprise an additional layer of adhesive. The outer faces of the metal layers are coated as before with the layers of adhesive 3 which, in turn, are protected by the "peel-off" layers.

The locating strip 1 is adapted to be installed in a vehicle disc brake of the kind in which a friction pad assembly is adapted to be applied to one or each side of a rotatable disc by a support with the strip 1 interposed between the pad assembly and the support.

Figure 3:
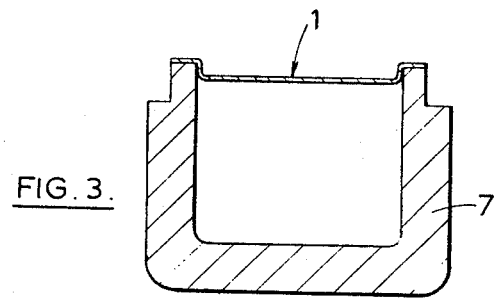
FIG. 3 is a section through an hydraulic piston with a locating strip attached to it.

As illustrated in FIG. 3 the support comprises an hydraulic piston 7 adapted to work in an hydraulic cylinder of the disc brake to apply a friction pad assembly directly to an adjacent face of the disc. The strip 1 is applied directly to the piston during assembly of the brake after removal of one of the "peel-off" layers so that the strip is attached to the piston by the adhesive. The other "peel-off" layer is removed before the pad assembly is inserted into the brake so that the piston 7 is secured to the pad assembly by means of the locating strip.

Figure 4:
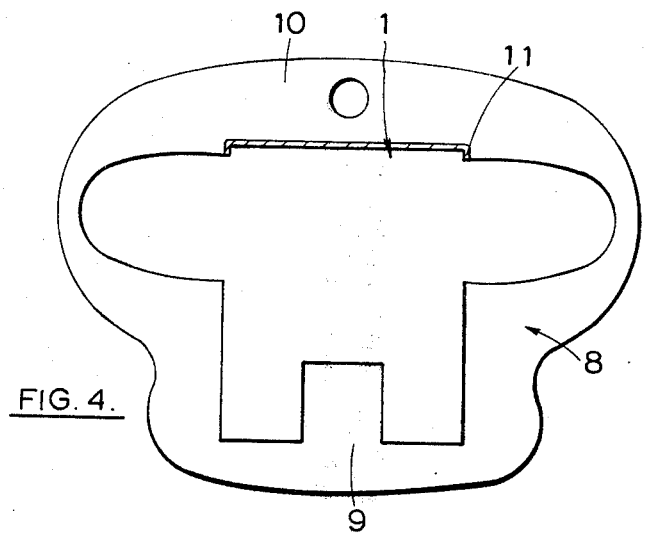
FIG. 4 is a yoke of a disc brake provided with a locating strip.

In the construction of FIG. 4 the support comprises a yoke 8 having opposed interconnected portion 9 and 10 disposed on opposite sides of the disc. The yoke 8 is slidably guided for axial movement in a stationary member in a direction to apply the brake in response to operation of actuating means. The actuating means act on the portion 9 in a direction to urge the portion 10 towards the disc. This indirectly urges a friction pad assembly into engagement with the disc. As illustrated the locating strip 1 is normally applied to the portion 10 and is received within a recess 11 in which the indirectly actuated friction pad assembly is at least partially received to locate it at least substantially against movement in a circumferential direction with respect to the yoke.

Figure 5:
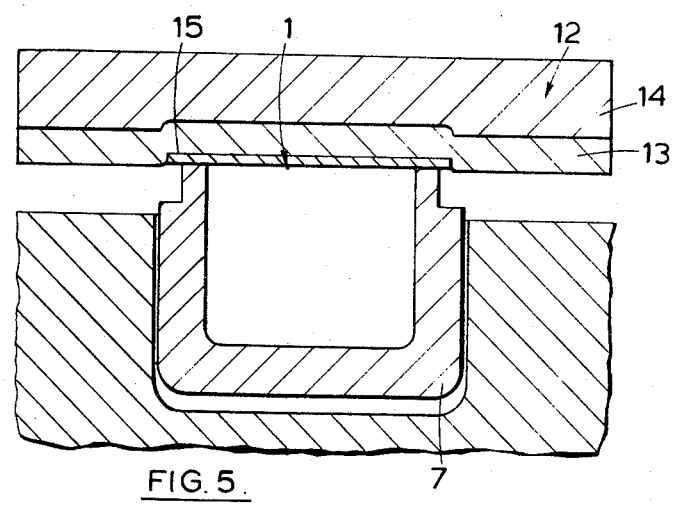
FIG. 5 is a section through a part of an hydraulically-operated disc brake with a locating strip interposed between an hydraulic piston and a friction pad assembly.

In the embodiment of FIG. 5 the support again comprises the hydraulic piston 7 for applying a friction pad assembly 12 to a rotatable disc. The friction pad assembly 12 comprises a rigid backing plate 13 carrying a pad 14 of friction material and the locating strip 1 is housed within a recess 15 in the backing plate.

Figure 6:
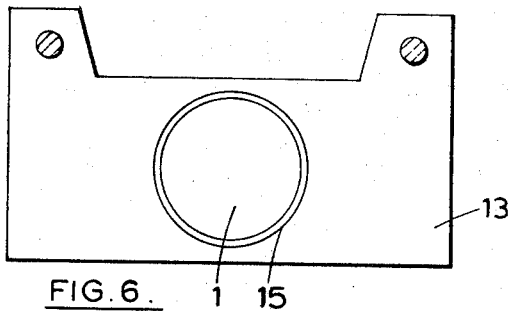
FIG. 6 is a side elevation of a friction pad assembly with a locating strip attached thereto.
Figure 7:
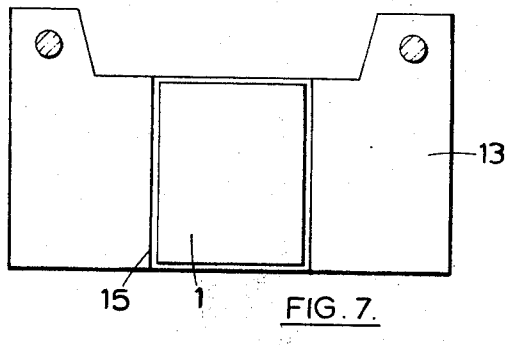
FIG. 7 is a view similar to FIG. 6 of a locating strip of different configuration.

The locating strip 1 and the recess 15 may be of any convenient complementary outline. For example, as shown in FIG. 6, the strip 1 and the recess 15 are circular. In FIG. 7 the recess comprises a transverse slot.

Figure 8:
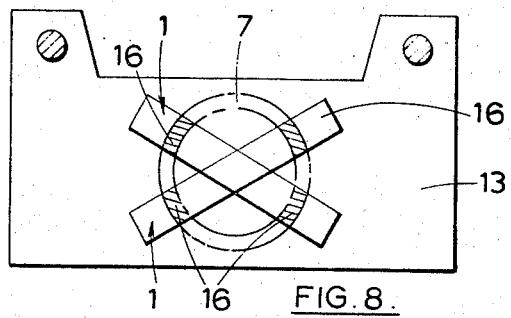
FIG. 8 is a view similar to FIG. 6 including a pair of locating strips.

In another construction illustrated in FIG. 8 strips 1 are applied diagonally to a planar face of the backing plate 13 so that the piston 7, shown in chain dotted outline, acts on the pad assembly only over four angularly spaced contact areas 16.

Figure 9:
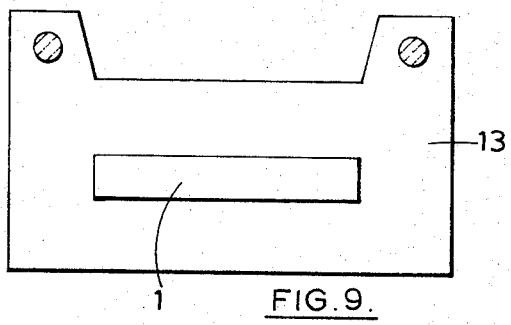
FIG. 9 is another view similar to FIG. 6 but including yet another configuration of locating strip.

In the construction shown in FIG. 9 a single strip 1 is applied to a planar face of the backing plate 13 for engagement by the support portion 10 of the yoke 8.

Figure 10:
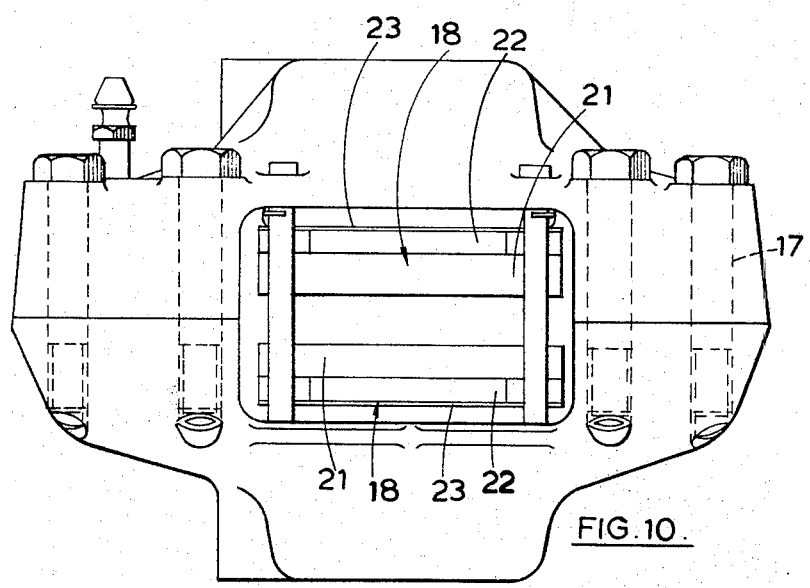
FIG. 10 is a plan of a disc brake.
Figure 11:
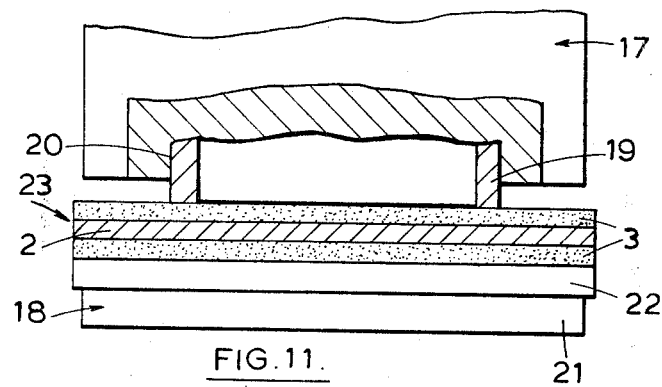
FIG. 11 is a view on an enlarged scale of a part of the disc brake.
Figure 12:
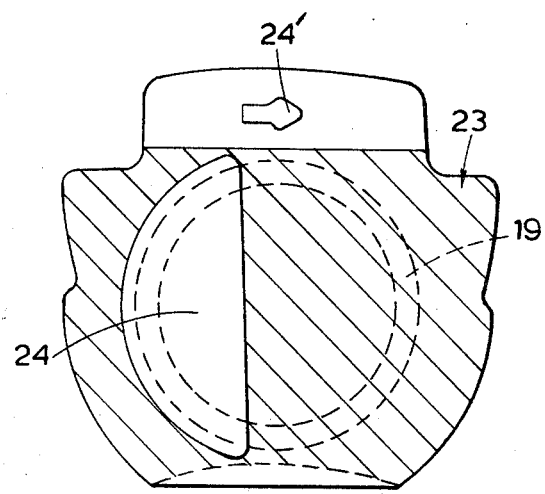
FIG. 12 is a side elevation of shim for use in the disc brake of FIGS. 10 and 11.

The disc brake illustrated in FIGS. 10 to 12 comprises a caliper 17 of generally U outline straddling a portion of the peripheral edge of a rotatable disc not shown. Friction pad assemblies 18 for engagement with opposite faces of the disc are guided in the caliper 17 for movement towards and away from the disc and are adapted to be applied to the disc by opposed pistons 19 working in hydraulic cylinders 20 in the caliper 17. Each friction pad assembly 18 comprises a pad of friction material 21 carried by a rigid backing plate 22, and there is interposed between each piston 19 and each backing plate a shim 23. A part 24 of each shim is cut out over a portion of what would normally be the area of contact between each piston 19 and the backing plate 22 on which it acts so that when the pistons are pressurised they apply thrust to the backing plate 22 only over the remainder of those areas. The shim 23 comprises a metal strip 2 which may be either a single member as illustrated in FIG. 1 or of laminated construction as shown in FIG. 2. In both cases the strip is coated with the adhesive layers 3 to locate the pad assemblies 18 and restrict and damp any relative movement, radial or circumferential between the pistons 19 and the pad assemblies 18.

As shown in FIG. 12 the shim 23 may be shaped to fit into the brake, and it may carry marking such as an arrow 24' to ensure that it is fitted correctly.

I claim:

1. Locating means for locating a friction pad assembly in a vehicle disc brake of the type comprising a rotatable disc, a friction pad assembly for engagement with said rotatable disc, and a support for urging said friction pad assembly into engagement with said disc to apply the brake, said locating means comprising a strip of substantially incompressible material adapted to be interposed in its position of use between said friction pad assembly and said support, and layers of adhesive coating both sides of said strip to attach said pad assembly to said support when said strip is disposed in the said position of use.

2. Locating means as claimed in claim 1, wherein said strip comprises a single strip of metal.

3. Locating means as claimed in claim 1, wherein said strip is of laminated construction comprising at least two separate metal layers, and resilient material interconnecting said metal layers.

4. Locating means as claimed in claim 1, wherein said adhesive is such that a bond formed by said adhesive between said friction pad assembly and said support is sufficient to prevent relative movement of said pad assembly in use but is not so great as to prevent withdrawal of said pad assembly when said pad assembly has to be replaced.

5. Locating means as claimed in claim 1, wherein said adhesive includes uncured rubber embedded in silk.

6. Locating means as claimed in claim 1, including protective layers for protecting exposed faces of said layers of adhesive, said protective layers being removable before said strip is inserted into a brake.

7. Locating means as claimed in claim 6, wherein said protective layers comprise layers of oiled paper which are adapted to be peeled off.

8. Locating means as claimed in claim 1, wherein said strip coated with said layers of adhesive is supplied in the form of a roll from which appropriate lengths are cut-off.

9. A friction pad assembly for a vehicle disc brake of the type comprising a rotatable disc, a friction pad assembly for engagement with said rotatable disc, and a support for urging said friction pad assembly into engagement with said disc, said friction pad assembly having first and second spaced parallel faces of which said first face comprises a friction face for engagement with said rotatable disc and said second face is adapted to be engaged by said support, said friction pad assembly being provided with and carrying a strip of substantially incompressible material having first and second opposite faces, a first layer of adhesive coating said first face of said strip and applied to said second face of said friction pad assembly to form a bond therebetween, and a second layer of adhesive coating said second face of said strip which is exposed, said second layer being adapted to serve to bond said pad assembly to a support when said friction pad assembly is installed in a brake.

10. A friction pad assembly as claimed in claim 9, wherein said second layer of adhesive is protected by a layer of oiled paper which is peeled off before said pad assembly is inserted into said brake.

11. A friction pad assembly as claimed in claim 9, wherein said pad assembly comprises a friction pad, and a rigid backing plate carrying said friction pad, and said strip is received within a recess in the face of said backing plate remote from the said pad.

12. A friction pad assembly as claimed in claim 9, wherein said strip comprises a shim having a cut-out so constructed and arranged that, when said pad assembly is in its position of use in said brake, the centre of area of an engagement between said support and said pad assembly lies on the side of the axis of said support opposite to that with which any given point on said disc first comes into alignment in the normal forward direction of disc rotation.

13. A disc brake for a vehicle comprising a rotatable disc, friction pad assemblies for engagement with opposite faces of said disc, actuating means for urging said friction pad assemblies into engagement with said disc and having supports acting on said pad assemblies, and locating means for attaching at least one of said pad assemblies to said support to locate said friction pad assembly without actually clamping it and restrict and damp any relative movement therebetween, said locating means comprising a strip of substantially incompressible material interposed between said friction pad assembly and said support, and layers of adhesive coating both faces of said strip to form a bond between said support and said strip and between said strip and said friction pad assembly.

14. A disc brake as claimed in claim 13, wherein locating means are provided for attaching both friction pad assemblies to said supports, each locating means comprising a strip of substantially incompressible material interposed between one support and said friction pad assembly on which the said one support is adapted to act, and layers of adhesive coating both faces of said strip to form a bond between the said one support and said strip and between said strip and said friction pad assembly.

15. A disc brake as claimed in claim 13, wherein said support comprises an hydraulic piston working in an hydraulic cylinder.

16. A disc brake as claimed in claim 15, wherein said strip comprises a shim of which a part is cut out over a portion which would normally be the area of contact between said piston and said one friction pad assembly whereby when said piston is pressurised it applies a thrust to said friction pad assembly only over the remainder of the said area.

17. A disc brake as claimed in claim 13, wherein said support comprises a portion of a yoke which acts on said one friction pad assembly to urge it into engagement with said disc in response to operation of said actuating means acting on another portion of said yoke which is disposed on the opposite side of said disc.

* * * * *